(12) United States Patent
Wimmer et al.

(10) Patent No.: US 9,216,743 B2
(45) Date of Patent: Dec. 22, 2015

(54) MOTOR VEHICLE HAVING A DRIVER ASSISTANCE DEVICE AND METHOD FOR OPERATING A MOTOR VEHICLE

(71) Applicant: AUDI AG, Ingolstadt (DE)

(72) Inventors: Martin Wimmer, Regensburg (DE); Karl-Heinz Siedersberger, Koenigsmoos (DE); Heike Sacher, Munich (DE); Fabian Scheiffert, Weinstadt (DE); Berthold Faerber, Glonn (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/377,139

(22) PCT Filed: Nov. 21, 2012

(86) PCT No.: PCT/EP2012/004816
§ 371 (c)(1),
(2) Date: Aug. 6, 2014

(87) PCT Pub. No.: WO2013/117205
PCT Pub. Date: Aug. 15, 2013

(65) Prior Publication Data
US 2015/0006014 A1    Jan. 1, 2015

(30) Foreign Application Priority Data
Feb. 6, 2012 (DE) .......... 10 2012 002 307

(51) Int. Cl.
*B60W 50/00* (2006.01)
*B60K 26/02* (2006.01)
(Continued)

(52) U.S. Cl.
CPC ........ *B60W 50/00* (2013.01); *B60K 26/02* (2013.01); *B60K 26/021* (2013.01); *B60K 37/06* (2013.01);
(Continued)

(58) Field of Classification Search
None
See application file for complete search history.

(56) References Cited

U.S. PATENT DOCUMENTS 8,355,838 B2 * 1/2013 Itoh et al. .......... 701/36
2002/0085043 A1 * 7/2002 Ribak .......... 345/810
(Continued)

FOREIGN PATENT DOCUMENTS

DE          102 09 846 A1    10/2002
DE    10 2004 019 893 A1    11/2005
(Continued)

OTHER PUBLICATIONS

WIPO English language translation of the International Preliminary Report on Patentability for PCT/EP2012/004816, downloaded from WIPO website Apr. 1, 2015, 10 pages.
(Continued)

*Primary Examiner* — Jason Holloway
(74) *Attorney, Agent, or Firm* — Staas & Halsey LLP

(57) ABSTRACT

A driver assistance device in a motor vehicle can completely or partially independently guide the motor vehicle. The driver assistance device has an operating device having a grip element which is arranged on a center console of the motor vehicle and on which a plurality of operating elements are arranged. To improve clarity, the grip element can be moved with respect to an interior trim of the motor vehicle by an actuator of the operating device. A control device of the driver assistance device is designed to adjust a position of the grip element with respect to the interior trim by controlling the actuator on the basis of the currently active assistance mode.

19 Claims, 3 Drawing Sheets

(51) Int. Cl.
  *B60K 37/06* (2006.01)
  *B60W 50/08* (2012.01)
  *B60W 30/12* (2006.01)
  *B60W 30/16* (2012.01)

(52) U.S. Cl.
  CPC ..... *B60K 2026/022* (2013.01); *B60K 2026/023* (2013.01); *B60K 2026/029* (2013.01); *B60K 2310/20* (2013.01); *B60K 2310/30* (2013.01); *B60K 2350/1016* (2013.01); *B60K 2350/1048* (2013.01); *B60K 2350/962* (2013.01); *B60W 30/12* (2013.01); *B60W 30/16* (2013.01); *B60W 50/082* (2013.01)

(56) References Cited

U.S. PATENT DOCUMENTS

2002/0152828 A1* 10/2002 Nagasaka et al. ............ 74/473.3
2008/0190681 A1* 8/2008 Mayser et al. ................ 180/170
2008/0250889 A1* 10/2008 Mack ........................ 74/471 XY
2011/0214525 A1* 9/2011 Voss et al. ........................ 74/504
2013/0233115 A1* 9/2013 MATSUO et al. .......... 74/484 R

FOREIGN PATENT DOCUMENTS

| | | |
|---|---|---|
| DE | 10 2006 018 537 A1 | 11/2007 |
| DE | 10 2007 029 594 A1 | 1/2009 |
| DE | 10 2008 014 879 A1 | 9/2009 |
| DE | 10 2010 053 889 A1 | 7/2011 |
| DE | 10 2010 022 433 A1 | 12/2011 |
| DE | 10 2012 002 307.3 | 2/2012 |
| EP | 1 980 441 A1 | 10/2008 |
| WO | PCT/EP2012/004816 | 11/2012 |

OTHER PUBLICATIONS

International Search Report mailed May 14, 2013 for corresponding International Patent Application No. PCT/EP2012/004816.
Search Report issued Oct. 28, 2012 for corresponding German Patent Application No. 10 2012 002 307.3.

* cited by examiner

MOTOR VEHICLE HAVING A DRIVER ASSISTANCE DEVICE AND METHOD FOR OPERATING A MOTOR VEHICLE

CROSS REFERENCE TO RELATED APPLICATIONS

This application is based on and hereby claims priority to International Application No. PCT/EP2012/004816 filed on Nov. 21, 2012 and German Application No. 10 2010 002 307.3 filed on Feb. 6, 2012, the contents of which are hereby incorporated by reference.

BACKGROUND

The invention relates to a motor vehicle and method for operating a motor vehicle having a driver assistance device which is designed to independently guide the motor vehicle during travel of the motor vehicle and in this case can be changed over between at least two assistance modes which differ from one another in terms of a degree of independence of the driver assistance device when guiding the motor vehicle.

The term "guiding the motor vehicle" comprises here, on the one hand, the steering of the motor vehicle (following the course of a road, orienting the motor vehicle within a lane, lane-changing maneuver), which is also referred to as lateral guidance, and, on the other hand, the control of the speed of the motor vehicle (accelerating, braking, emergency braking, maintaining the speed), which is also referred to as longitudinal guidance.

A driver assistance system of the specified type is known from DE 10 2010 022 433 A1. According to said document, a driver assistance system can, in a fully automatic assistance mode, guide the vehicle completely independently. The driver of the motor vehicle then has to operate neither the steering wheel nor the pedals of the motor vehicle during travel and can therefore turn his attention to other things, for example the operation of an infotainment system, for a relatively long period.

However, independent guidance of the motor vehicle can also be understood as meaning a semi-automatic assistance mode in which the degree of independence of the driver assistance system is reduced when guiding the motor vehicle and which can then include, for example, merely of the functionality of adjusting the speed of the motor vehicle to a desired or set speed which is predefined by the driver by setting a value of the corresponding driving parameter of the driver assistance system (cruise control).

A further desirable assistance mode is the autonomous guidance of the motor vehicle by a driver assistance device. In contrast to the fully automatic assistance mode, in the autonomous assistance mode the driver assistance device also decides which values are to be implemented for the driving parameters (desired distances, desired speed) for a currently implemented driving maneuver and/or which driving maneuvers (lane change, turning off the road, parking and the like) are to be implemented. In contrast, in the fully automatic assistance mode, provision is made for the driver to use a user interface to predefine which driving maneuvers are to be implemented or which distances and speeds are to be adjusted by the driver assistance device during a currently implemented driving maneuver when traveling along a lane. Another difference between the two assistance modes can relate to how the driver assistance device reacts in the event of an unforeseen development of events on the road, that is to say if safe guidance is no longer ensured by the driver assistance device. In the fully automatic assistance mode, provision is then made for the driver assistance device to be deactivated and to transfer control of the motor vehicle to the driver, while, in contrast, in the autonomous assistance mode, the driver assistance device itself places the motor vehicle in a safe state, for example by stopping the motor vehicle.

Depending on the currently active assistance mode, certain guidance tasks are carried out independently by the motor vehicle, i.e. without involvement of the driver, during travel. However, in this case, it must be ensured, for each assistance mode in which the driver assistance device can be operated, that the driver is always clear as to the degree to which the driver assistance system monitors and guides the motor vehicle, which intervention possibilities are still available to the driver himself during the guidance of the motor vehicle and which guidance tasks the driver must necessarily carry out himself. If the driver loses an overview here, his safety may be compromised. If the driver wrongly believes, for example, that the driver assistance device is in the fully automatic assistance mode and therefore lets go of the steering wheel in order to deal with the infotainment system, the vehicle may run off the road in this case because the driver assistance device is, for example, not activated at all, that is to say a fully manual driving mode is demanded of the driver (this is therefore referred to as the manual assistance mode here).

The range of independence of the driver assistance device (automation range) which extends from manual driving to partial and full automation and then on to autonomy should in its complexity in future be transparent and comprehensible to the user in terms of operating it. Important properties of future operating concepts are a manageable complexity of these four specified assistance modes, clear delimitability between the individual assistance modes and characteristic operating modalities within the individual assistance modes. Whereas established operating elements such as buttons, a steering wheel or a lever are available for partial automation (for example cruise control, active lane control, i.e. lane-keeping assistance), until now there have only been conceptual approaches to the prototypical operation of full automation and autonomy. These approaches are frequently merely supplements or extensions of existing operating concepts and constitute isolated solutions. Such isolated solutions generally do not amount to anything more than mere functional integration into existing operating elements, which leads to an increase in the functional density of the individual operating elements and therefore is not targeted owing to the variety and complexity of the operating devices which result therefrom. The manageability and functional variety of current operating elements have already been fully exploited.

SUMMARY

One potential object is to ensure clarity when operating a driver assistance device in a motor vehicle having a driver assistance device which can guide the motor vehicle completely or partially independently.

The inventors propose a driver assistance device has a grip element, that is to say a lever for example, which is arranged in a primary gripping area for a driver of the motor vehicle and on which a plurality of operating elements of the driver assistance device are arranged. In this case, a primary gripping area should be generally understood as meaning that region of the motor vehicle which can be reached by the driver with a hand from the driver's seat in a relaxed, reclined posture, that is to say the center console or the driver's door of the motor vehicle, for instance. A driver can be guided by the grip element when guiding the motor vehicle if he wishes to know which assistance mode the driver assistance device is currently in. For this purpose, the grip element can be moved with respect to the interior trim of the motor vehicle, that is to say a housing of the center console or a trim of the side door, by an actuator of the operating device. A control device of the driver assistance device is designed to actively adjust a position of the grip element with respect to interior trim by controlling the actuator, in which case the improved orientation of the driver when operating the driver assistance device precisely results, in accordance with a method proposed by the inventors, from the fact that the position of the grip element is adjusted by the control device using the actuators on the basis of which assistance mode is currently active. Adjusting the position changes the relative position of the grip element with respect to the driver, with the result that the driver must simply only place a hand on the grip element in order to become clear as to which assistance mode the driver assistance device is currently in and which operating possibilities the driver actually has. For example, if the grip element is in the position which indicates the fully automatic assistance mode, the driver intuitively knows that he now no longer actively needs to steer the vehicle and must control the driving behavior of the motor vehicle only using the grip element. He can therefore let go of the steering wheel in this case and also need not be startled if the vehicle no longer reacts to operation of the steering wheel.

The concept of an actively adjustable grip element with operating elements integrated therein has the advantage that the operation of the automation range (manual driving, semi-automatic and fully automatic assistance mode and autonomous assistance mode) provides orientation using the single grip element: the position of the grip element and the operating properties of the individual operating elements can be adapted in a variable manner and on the basis of the currently selected assistance mode.

One advantageous embodiment of the motor vehicle provides for the grip element to have at least one of the operating elements on one of its end faces which faces a driver's seat of the motor vehicle. This is preferably a pushbutton switch which may be in the form of a rocker, for example. If the driver grips around the grip element, he can very easily actuate this operating element with his thumb. In this case, in at least one of the assistance modes, the operating element is operated in such a manner that it can be used to set a driving parameter of the driver assistance system on which the guidance behavior of the driver assistance device is dependent. For example, provision may be made for the desired or set speed for cruise control to be set in the semi-automatic assistance mode using the operating element. This embodiment of the motor vehicle has the advantage that, by changing the position of the grip element, the operating element can only be easily gripped by the driver, that is to say is presented to the latter, when the grip element is also in the position belonging to the semi-automatic assistance mode. In another assistance mode in which the operating element does not have a function, the operating element can then be pivoted out of the primary gripping range of the driver, which gripping range can be easily reached by the driver during travel and without diverting his gaze from the traffic. The situation in which the driver inadvertently attempts to carry out an operating action on the operating element in the incorrect assistance mode is then avoided.

In order to change between two assistance modes, the grip element expediently has an operating element on a side which can be reached by the user of the operating device at least in a predominant number of possible positions of the grip element. For example, a button may be provided here on a top side of the grip element. The driver can therefore advantageously reach for the grip element without diverting his gaze from the traffic, can discern the currently active assistance mode from the position of the grip element and can then immediately activate the "next higher" assistance mode, that is to say can increase the degree of independence of the driver assistance device, by operating the operating element. A sensor button which can be used to reliably distinguish between whether the driver has only placed his hand on the grip element or actually wishes to actuate the sensor button has proved to be particularly favorable here. At the same time, this also forces a position of the hand when operating the sensor (perpendicular tapping of the button), in which position the situation in which the hand gets caught during automatic movement of the operating device is avoided. Suitable sensor buttons are based on a capacitive sensor or an infrared sensor, for example.

It has proved to be particularly advantageous if not only the individual operating elements but also the grip element itself are used to operate the driver assistance device. For this purpose, the grip element can be operated as a control lever in at least one assistance mode, which control lever can be deflected in a monostable manner by rotational deflection (for example tilting) and/or rotation and/or translatory deflection in a manner transverse to a vertical axis of the motor vehicle. In other words, the grip element can be used as a type of "joystick" here. In this case, the deflection is then carried out with respect to that position into which the grip element was originally brought by the control device in the respective assistance mode. Indirect guidance of the motor vehicle by the grip element is expedient, in particular in connection with a fully automatic assistance mode. Intuitive operation of the user interface (already described) in order to trigger driving maneuvers can be enabled using a control lever.

A force-displacement characteristic curve is expediently set during operation of the grip element as a control lever by at least one actuator of the operating device on the grip element. Such a characteristic curve makes it possible to oppose the user of the operating device with a predetermined counterforce on the basis of a deflection of the grip element. This makes it possible to then transmit an item of information to the user in a haptic manner by a force decrease or a force increase, for example a particularly favorable speed or distance setting or a risk of guiding the vehicle too close to the curb, which risk is associated with increasing deflection of the grip element.

It has likewise proved to be expedient to produce force feedback for the operator of the operating device by at least one actuator on the grip element. Unlike in the case of a force-displacement characteristic curve, the control lever can then additionally be deflected in another direction counter to the force of the operator's hand. This makes it possible to give the operator an impression of the actual road conditions or else an operating recommendation. Parameters from an environment sensing system (image processing on the basis of a camera or a radar) may likewise be communicated to the user.

Since the position of the grip element is changed when changing between two assistance modes, it must be ensured in this case that the operator's hand does not get caught between the grip element and the housing of the center console or the side trim. This is preferably achieved by virtue of the fact that a deactivation button is provided in the primary gripping area at a distance from the grip element, and the driver assistance device is designed to deactivate the currently active assistance mode when the deactivation button is actuated. When the deactivation button is actuated by the operator, it is therefore ensured that the operator's hand is on the deactivation button and is not in the region of the grip element.

In the motor vehicle, the driver assistance device can be used in a very flexible manner to operate a multiplicity of different assistance modes. One embodiment of the motor vehicle therefore provides for the driver assistance device to be designed to guide the motor vehicle in a semi-automatic manner in a semi-automatic assistance mode on the basis of driving parameters which can be set by a driver using the operating device. In this case, however, by maintaining corresponding mechanical or electromechanical coupling, it is possible for the driver to directly intervene in the guidance of the motor vehicle using a steering handle, that is to say a steering wheel for instance, and/or a pedal. Semi-automatic guidance by the driver assistance system should be understood as meaning, in particular, that the driver assistance device sets the speed and complies with a distance between the motor vehicle and a vehicle traveling in front.

As already mentioned, it is also possible to implement an embodiment of the motor vehicle in which the driver assistance device is designed to guide the motor vehicle in a fully automatic manner in a fully automatic assistance mode by independent lateral and longitudinal guidance and in this case to receive a selection of a driving maneuver to be implemented by the driver assistance device and/or to receive a value for a driving parameter of a currently implemented driving maneuver from the driver via a user interface. In this case, it is then particularly appropriate to operate the grip element as a control lever in order to trigger the driving maneuvers or set the driving parameters. The user interface may be, for example, that interface which was filed as German Application No. 10 2012 002 304.9 filed on Feb. 6, 2012 by the applicant together with the present application on the same date.

In the motor vehicle, provision may even be made for the driver assistance device to be designed to autonomously guide the motor vehicle in an autonomous assistance mode the motor vehicle in an autonomous assistance mode in a fully automatic manner by independent lateral and longitudinal guidance and in this case to also independently determine a driving parameter value for a driving parameter of a currently implemented driving maneuver and/or to independently select a driving maneuver to be implemented.

In connection with the autonomous assistance mode or the manual assistance mode in which no intervention in the vehicle guidance by the driver assistance device is provided, an advantageous development of the motor vehicle results if the control device is set up to bring the grip element into bearing contact with the housing of the center console or the trim or to countersink the grip element therein in at least one of these assistance modes. This then makes it impossible for a user of the operating device to grip around the grip element. If the user therefore attempts to grip around the grip element in order to actuate one of its operating elements or to use the grip element as a control lever, the user is prevented from doing so by the position of the grip element and is reminded that he is currently not able to operate the driver assistance device.

Although the position into which the grip element is moved by the control device when a corresponding assistance mode is switched on is predetermined, it can be determined in any desired manner by a user, for example during production of the motor vehicle or during configuration. Provision is preferably made for the grip element to be moved, in the vehicle longitudinal direction, with an increasing degree of independence of the driver assistance device, into a position which is further away from the steering wheel. Four assistance modes are provided in a very particularly preferred embodiment, namely a manual assistance mode in which no guidance at all by the driver assistance apparatus is provided, a semi-automatic assistance mode in which at least cruise control is provided, a fully automatic assistance mode in which at least independent lateral guidance is provided, and an autonomous assistance mode in which completely independent guidance of the motor vehicle by the driver assistance device without the possibility of intervention by the driver is provided. As this sequence of assistance modes is run through by corresponding changeover, the grip element is gradually moved in this case from the front (manual driving) on the center console to a position further to the rear with each changeover operation until it finally comes into bearing contact with a rear wall of the housing of the center console in the autonomous assistance mode.

In connection with the proposed method, it also may include developments and features which have already been described in connection with the motor vehicle. Therefore, these developments of the method are not explained again here.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
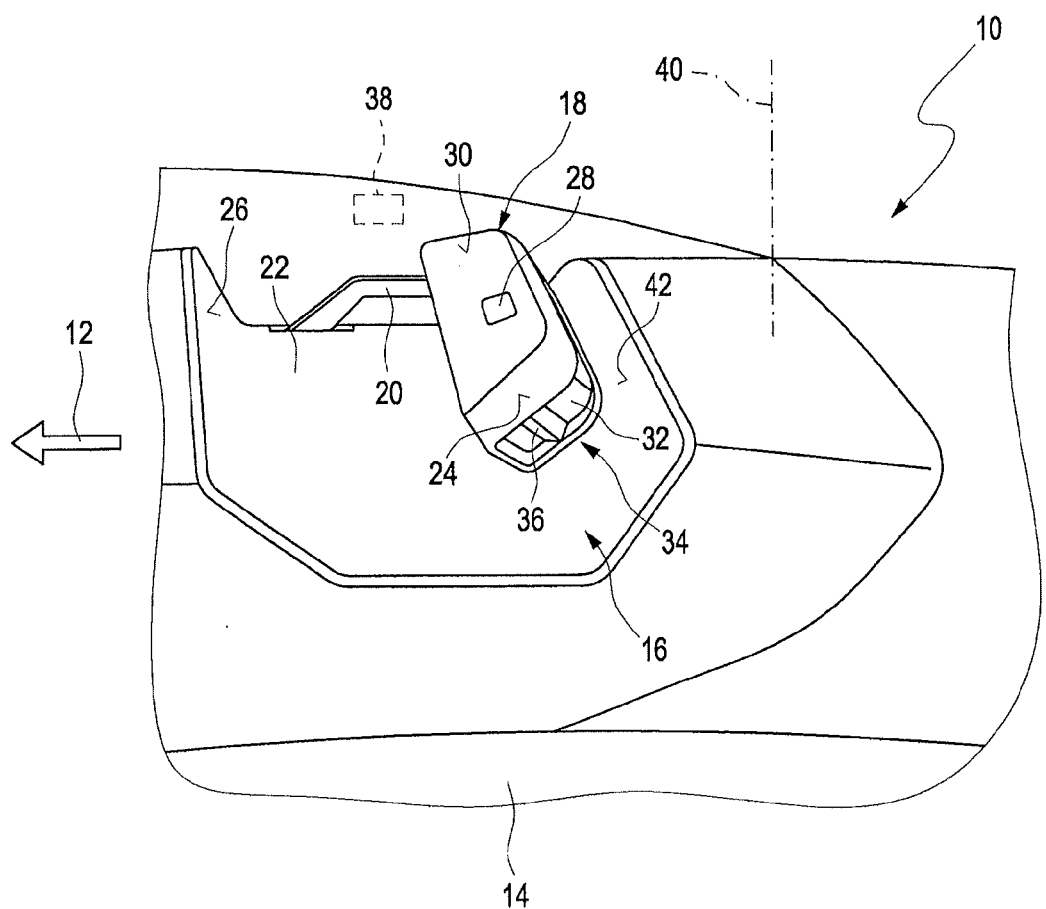
FIG. 1 shows a schematic illustration of a center console of a potential embodiment of the proposed motor vehicle, in a perspective view.

Reference will now be made in detail to the preferred embodiments of the present invention, examples of which are illustrated in the accompanying drawings, wherein like reference numerals refer to like elements throughout.

Figure 2:
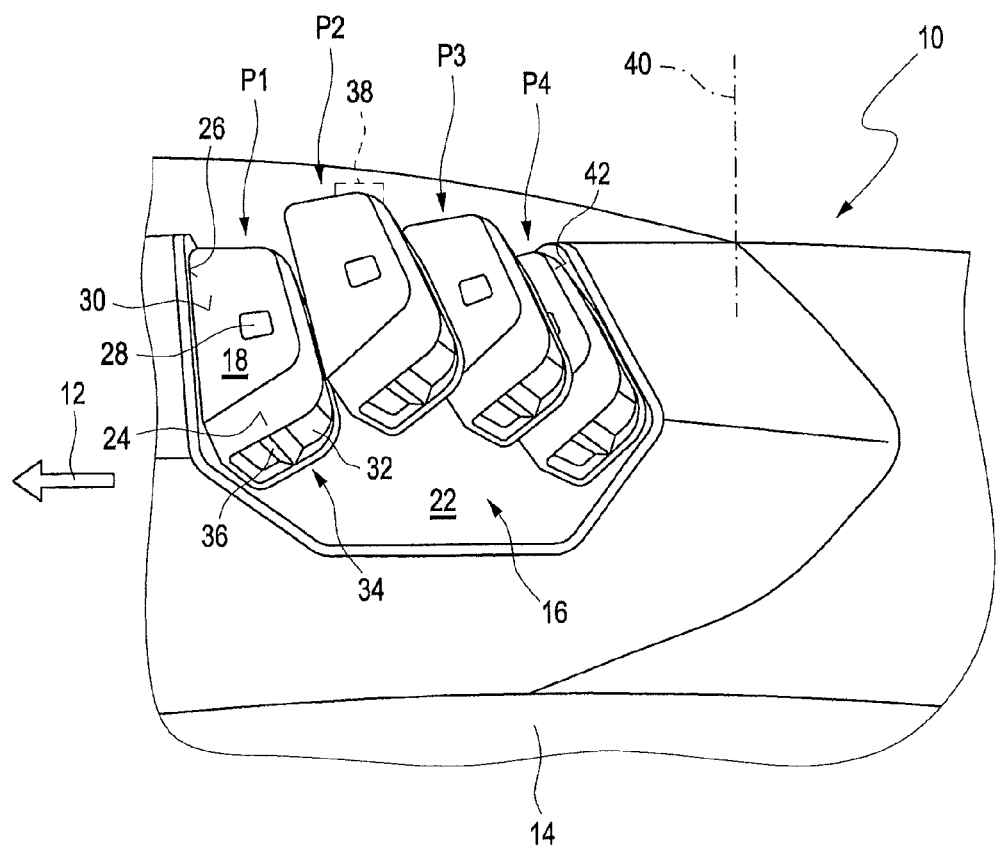
FIG. 2 shows a schematic illustration of a movement sequence of a grip element on the center console from FIG. 1 in a perspective view.
Figure 3:
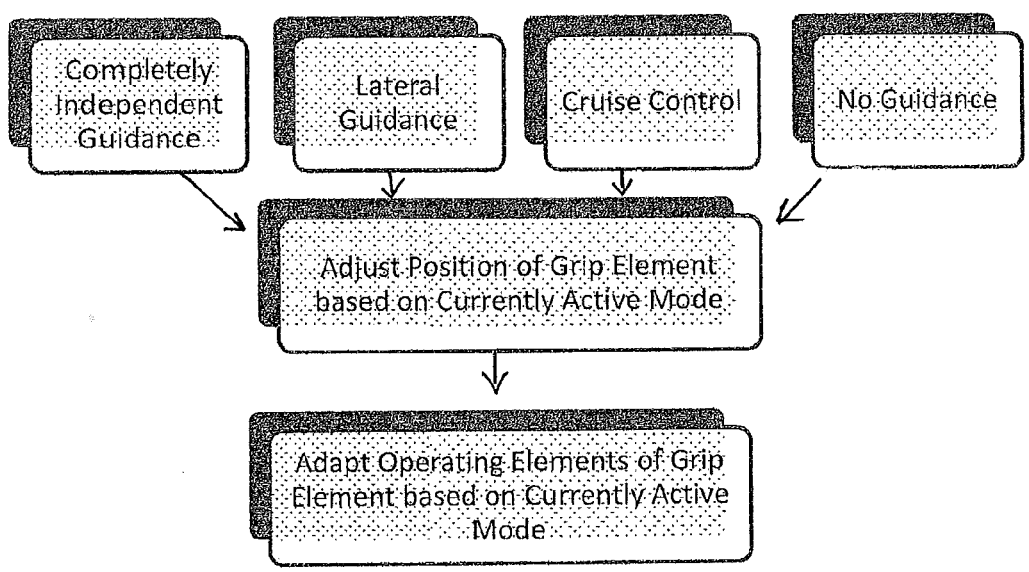
FIG. 3 is a flow chart showing one potential embodiment for the proposed method.

FIG. 1 shows a center console 10 of a motor vehicle which is not illustrated any further. The motor vehicle may be, for example, an electrically driven automobile or an automobile driven with an internal combustion engine. The center console 10 is situated beside a driver's seat 14, as seen in the forward direction of travel 12 of the motor vehicle. A recess 16 is formed in the center console 10, in which recess a grip element 18 is supported by a support element 20, for example a metal limb. In the example shown in FIG. 1, the grip element 18 has a basic shape of a cuboid with rounded corners and edges, similar to an ingot or a glasses case. It may be, for example, a hollow body which is produced using injection molding technology and may be covered with artificial leather. The grip element 18 is mechanically coupled, via the support element 20, to an actuator (not illustrated), for instance an electric motor, which is inside a casing or a housing 22 of the center console 10. A control unit (not illustrated) can change a position of the grip element 18 inside the recess 16 by the actuator. FIG. 2 illustrates, in a superimposed illustration, which four predetermined positions P1, P2, P3, P4 can be assumed by the grip element 18 within the recess 14. The control unit may be a microcontroller, for example.

In the positions P2 and P3, the grip element 18 forms a lever, around which a driver sitting on the driver's seat 14 can grip and which can be used by the driver to exert a force on sensors inside the housing 22 via the support element 20. This lever embodies an integrative approach which simplifies the operation of an automation range of a driver assistance device of the motor vehicle for the driver. When the driver assistance system is activated, partial automation and full automation all the way to autonomy when guiding the motor vehicle by the driver assistance system can be enabled on the basis of an assistance mode. In this case, the grip element 18 and the support element 20 provide a single operating part in the form of a lever, the position of the grip element 18 and the operating properties of individual operating elements arranged thereon being variable and being able to be set on the basis of the currently active assistance mode.

The established operating elements are therefore used for manual driving, that is to say the steering wheel and the pedals are directly coupled to the steering system of the motor vehicle or to the engine. In this manual assistance mode of the driver assistance device, the grip element 18 is flush with a front wall 26 of the recess 16, as seen in the direction of travel 12 (position P1). It is then not possible to clasp the grip element 18. After a sensor button 28 has been actuated, the grip element 18 is moved from its flush position into the position P2 by the actuator in the center console 10. A semi-automatic assistance mode in the driver assistance device is likewise activated by pressing the sensor button 28. The sensor button 28 may be a capacitive button, for example. The button 28 is situated on a top side 30 of the grip element 18, which top side can be easily reached by the driver in all four positions P1 to P4. A touch surface of the button 28 is preferably smaller than the surface of the side 30, with the result that a driver does not unintentionally actuate the button 28 when gripping around the grip element 18.

Instead of only bringing the grip element 18 into bearing contact with the wall 26 in the manual assistance mode, provision may also be made for a shaft to be provided in the housing 22, in which the grip element 18 can be countersunk. In this case, it should then be ensured that the sensor button 28 remains reachable in order to be able to activate the next higher assistance mode (that is to say the semi-automatic assistance mode in this case). The sensor button 28 is activated only if the driver assistance device detects that the vehicle can be independently guided by the driver assistance device in the semi-automatic assistance mode.

As soon as the grip element 18 reaches the position P2, the driver discerns from its position P2 that the driver assistance device is in the semi-automatic assistance mode. In this case, the driver assistance device is then first of all in the stand-by mode, that is to say does not yet intervene in the guidance of the motor vehicle, but can be activated by the driver by pressing a SET button 32. The SET button 32 is part of a button area 34 on an end face 24 of the grip element 18 facing the driver. The button area 34 also comprises an operating element 36 for adjusting the speed, which operating element is used to change the set speed in the semi-automatic assistance mode. The operating element 36 may be in the form of a rotary knob, a monostable rocker or a rocker button, for example. The semi-automatic assistance mode can be deactivated again by actuating an operating element 38 which is installed in the center console in the area surrounding the grip element 18. The operating element 38 may be a deactivation button, for example. Actuating the deactivation button 38 outside the gripping and movement region for the grip element 18 means that there is no risk of crushing.

In the case of the deactivation button 38, provision may be made for the semi-automatic assistance mode to be retained and to only be changed to the stand-by mode by pressing the button for a relatively short time, whereas the semi-automatic assistance mode is deactivated and is changed to the manual assistance mode again by pressing the deactivation button 38 for a long time (so-called "long push").

In the semi-automatic assistance mode (position P2 of the grip element 18), a desired distance of a longitudinal control system of the driver assistance system can also be effected by longitudinally shifting the grip element 18 along the direction of travel 12. In this case, the desired distance forms a driving parameter of the driver assistance device. For this purpose, the grip element 18 is mounted in a monostable manner in the position P2, that is to say it moves by itself back into this position P2 again when it is released. In order to set the desired distance, the grip element 18 is kept deflected from the position P2 until an indication and/or the actual desired distance is/are at the desired level.

In the semi-automatic assistance mode, it is also possible for the driver to intervene in the longitudinal guidance and thus to change the speed by actuating the gas pedal or the brake pedal. By briefly deflecting the grip element 18 in the longitudinal direction 12 of the vehicle, the driver can then again cause the driver assistance system to adjust the speed of the motor vehicle to the set speed (so-called resume function). The described deflections of the grip element 18 along the direction of travel 12 have proved to be particularly useful from an ergonomic point of view. However, in connection with another refinement of the vehicle interior, it may also be expedient to alternatively or additionally allow a movement to the rear, that is to say contrary to the direction of travel 12, or else in a manner transverse to the direction of travel as a further actuating action.

The next higher automation level, in which the driver assistance system can guide the motor vehicle, can be activated via the sensor button 28 on the top side 30 of the grip element 18 and/or via a manual adjustment by the user. In this case, the grip element 18 is brought into the position P3. In this fully automatic assistance mode which has then been set, the actuating elements of the button area 34 do not have a function, apart from the sensor button 28 and the deactivation button 38. A parameter and maneuvering interface for operating the driver assistance system in the fully automatic assistance mode is implemented by manual deflectability of the lever in an X-Y plane perpendicular to the vehicle vertical axis 40. In this case, the parameter and maneuvering interface may additionally comprise a screen which displays, to the driver, the desired distance from a vehicle traveling in front which the driver assistance device is attempting to adjust and the lateral position which is intended to be assumed by the motor vehicle in the lane currently being traveled on. The desired distance and the lateral position as well as a desired speed (if no vehicle is traveling in front) form driving parameters in the fully automatic assistance mode. By virtue of the fact that the driver now exerts a force on the support element 20 at the grip element 18 along the direction of travel 12 or transversely with respect to the latter, the sensors on the support element 20 detect these actuating actions and the desired values are accordingly set in the fully automatic assistance mode. In the position P3 of full automation, the grip element 18 can be conveniently reached without a large amount of movement by the driver who is sitting in a relaxed manner and no longer needs to actuate the steering wheel. If the driver uses the grip element 18 as a hand rest, he can be additionally informed at any time of the current desired values for the controlled guidance of the motor vehicle by the driver assistance system by force feedback from the parameter and maneuvering interface, which feedback is produced using the actuators in the center console 10. In this case, the position P3 of the grip element 18 is then dependent both on the currently active assistance mode (fully automatic assistance mode) and on the desired values which are presented to the driver using the force feedback.

The function of a starting trigger can additionally be achieved using the grip element 18. As a result, after the motor vehicle has been automatically braked by the driver assistance system and before automatic restarting, it is then possible to obtain confirmation from the driver that he is prepared for the restarting. The SET button 32, for example, can be used as a starting trigger. A potential trigger can also be achieved using the grip element 18. Such a trigger is described, for example, in the document DE 10 2010 022 433 A1 which has already been mentioned.

In connection with the operation of the parameter and maneuvering interface mentioned, provision can also be made for the driver's hand on the grip element 18 to be opposed with a force which is produced by one of the actuators in the center console 10. This makes it possible to signal to the driver during deflection of the grip element 18, by a force-displacement characteristic curve, where particularly favorable or unfavorable values result for the driving parameters to be set. It is therefore possible to signal to the driver, for example, that the distance from the vehicle traveling in front, which has been set by him, is becoming too short by making it difficult for the driver to deflect the grip element 18 further in the direction of travel 12. Force decreases in the force-displacement profile make it possible to indicate a favorable value in a tactile manner.

The driver assistance system of the motor vehicle is additionally able to autonomously guide the motor vehicle. In this case, the driver assistance system itself then decides which distance from the vehicle traveling in front and which lateral position should be assumed by the motor vehicle in a lane. The driver assistance system may then similarly independently start and carry out an overtaking maneuver, a turning-off maneuver, a parking maneuver and the like. The autonomous assistance mode of the driver assistance system can be activated in this case only when the driver assistance system detects that the vehicle can be changed to a safe state at any time even without involvement of the driver, that is to say the vehicle can be brought to a standstill, for example. Such an autonomous mode is conceivable, for example, in a traffic jam situation if the motor vehicle can be guided only at walking speed.

If the autonomous mode is appropriate for activation under given switch-on conditions, it can be activated by the driver by actuating the sensor button 28 on the surface 30 of the lever. Besides the autonomous assistance mode, no actuation of the grip element 18 and the buttons of the button area 34 which are situated thereon is provided in a manner similar to the position P1 of manual driving. Only manual deactivation using the deactivation button 38 must be ensured. Therefore, in the autonomous assistance mode, the grip element 18 is again moved into a flush position with a wall 42 of the recess 14. This position P4 of the grip element 18 in the autonomous assistance mode differs from the position P1 in the manual assistance mode in a manner clearly discernible to the driver.

If the autonomous assistance mode is deactivated again by actuating the deactivation button 38, the grip element 18 automatically moves into a fallback position, for example into the position P2, where the stand-by mode of the semi-automatic assistance mode can then be activated.

The following table again summarizes the operating possibilities which are provided to the driver via the grip element 18 and the deactivation button 38 on the basis of the different assistance modes by virtue of functionalities of the driver assistance system being respectively assigned to the individual operating elements.

| Function | Operation | Explanation |
|---|---|---|
| Manual driving (P1) | | |
| Change to partial automation | Button 28 | Lever is moved |
| Partial automation (P2) | | |
| Stand-by mode | Button 38 | Button on center console |
| SET | Button 32 | |
| Speed setting | Button 36 | |
| Setting the desired time gap | Tap the grip element in ±x for a long time | Direction of travel 12 corresponds to the −x direction |
| Resume and starting trigger | Tap the grip element 18 in ±x for a short time | |
| Change to full automation | Button 28 | Sensor button |
| OFF | Button 38 (tap for a long time) | Button on center console |
| Full automation (P3) | | |
| Starting trigger Potential trigger | Button 32 | |
| Maneuvering interface | Shift grip element in the X-Y plane | Monostable deflection perpendicular to the vehicle vertical axis |
| Change to autonomy | Button 28 | Sensor button |
| Deactivation of full automation | Button 38 | Button on center console |
| Autonomy (P4) | | |
| Deactivation of autonomy | Button 38 | Button on center console |

The examples show how the indicator effect of the grip element (positions P1 to P4) on the basis of the different degrees of independence of the assistance modes of the driver assistance system and the mode-dependent operating possibilities of the grip element 18 and its operating elements provide a highly system-specific representation and operability of the driver assistance device in the respective assistance modes. This increases the system transparency and simplifies the learnability of the automation range for the driver. The described active feedback from the grip element 18 in the fully automatic assistance mode can additionally make it possible to communicate the state of the "vehicle controlled system" (that is to say the presentation of the desired values of the driving parameters which define the guidance behavior of the driver assistance device) to the driver even while operating an infotainment system, for example. The position of the actuating part, which is variable in the direction of travel 12 on the basis of the currently active assistance mode, also makes it possible to position the operating elements in relation to the steering wheel in a manner which is optimal for operation by a driver for the semi-automatic and fully automatic assistance mode. It is therefore possible to grip around the grip element in these assistance modes without any problems and to achieve a comfortable sitting position with good ability to reach the grip element 18 in the motor vehicle.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A motor vehicle comprising:
a driver assistance device to independently guide the motor vehicle during travel of the motor vehicle, the driver assistance device being changeable between a plurality of assistance modes comprising an autonomous assistance mode providing completely independent guidance of the motor vehicle, a fully automatic assistance mode providing at least independent lateral guidance, a semi-automatic assistance mode providing at least cruise control, and a manual driving mode providing no guidance at all, the driver assistance device comprising:
 a grip element arranged in a primary gripping area for a driver of the motor vehicle;
 a plurality of operating elements arranged on and integrated in the grip element, the operating elements having respective operating properties that adapt in a variable manner to a currently active assistance mode;
 an actuator to move the grip element with respect to an interior trim of the motor vehicle; and
 a control device to adjust a position of the grip element with respect to the interior trim by controlling the actuator based on a currently active assistance mode, the control device adjusting the position of the grip element such that in transitioning from the manual driving mode to the autonomous assistance mode via the semi-automatic assistance mode and the fully automatic assistance mode, the position of the grip element becomes progressively further from the steering wheel with increased independence of the driver assistance device, so as to provide orientation to the driver regarding the currently active assistance mode.

2. The motor vehicle as claimed in claim 1, wherein the plurality of operating elements comprise a pushbutton switch provided on an end face of the gripping element facing a driver's seat of the motor vehicle, and
in at least one of the assistance modes, the pushbutton switch sets a driving parameter so that the driver assistance device guides the motor vehicle in a manner dependent on the driving parameter.

3. The motor vehicle as claimed in claim 1, wherein the plurality of operating elements comprise a mode operating element provided on a side of the grip element which can be reached by the driver at least in most positions of the grip element, and
the driver assistance device changes the currently active assistance mode when the mode operating element is actuated.

4. The motor vehicle as claimed in claim 3, wherein actuating the mode operating element changes the currently active assistance mode to a next mode of increasing assistance.

5. The motor vehicle as claimed in claim 1, wherein in at least one of the assistance modes, the grip element operates as a control lever, which can be deflected in a monostable manner from a position of rest by tilting and/or rotation and/or deflection in a direction transverse to a vertical axis of the motor vehicle, the position of rest corresponding to the currently active assistance mode.

6. The motor vehicle as claimed in claim 5, wherein the control device sets a force-displacement characteristic curve when the grip element operates as a control lever, and
the control device causes an actuator to apply a predetermined counterforce on the grip element to oppose movement of the grip element by the driver, in accordance with the force-displacement characteristic curve.

7. The motor vehicle as claimed in claim 1, wherein the control device causes an actuator to produce a feedback force on the grip element, and
the feedback force provides the driver with feedback information regarding road conditions.

8. The motor vehicle as claimed in claim 1, wherein a deactivation button is provided in the primary gripping area, at a distance from the grip element, and
the driver assistance device deactivates the currently active assistance mode when the deactivation button is actuated.

9. The motor vehicle as claimed in claim 1, wherein in the semi-automatic assistance mode, the driver assistance device guides the motor vehicle in a semi-automatic manner based on driving parameters set by the driver using the grip element, and
in the semi-automatic assistance mode, a mechanical coupling to a steering wheel and/or a pedal is maintained, for the driver to directly intervene in guidance of the motor vehicle.

10. The motor vehicle as claimed in claim 1, wherein in the fully automatic assistance mode, the driver assistance device guides the motor vehicle in a fully automatic manner with independent lateral and longitudinal guidance,
in the fully automatic assistance mode, the driver assistance device receives input regarding a driving maneuver to be performed and/or receives a driving parameter to alter a driving maneuver currently being performed, and
the driver assistance device receives the input from the driver via a user interface.

11. The motor vehicle as claimed in claim 1, wherein in the autonomous assistance mode, the driver assistance device autonomously guides the motor vehicle in a fully automatic manner, providing independent lateral and longitudinal guidance and independently determining driving parameters to alter a driving maneuver currently being performed and/or independently making decisions on driving maneuvers to be performed.

12. The motor vehicle as claimed in claim 1, wherein in at least one the assistance modes, the control device makes it impossible for the driver to grip around the grip element by:
 moving the grip element into bearing contact with the interior trim of the motor vehicle and/or
 moving the grip element to countersink the grip element in the interior trim of the motor vehicle.

13. The motor vehicle as claimed in claim 12, wherein a mode operating element is provided on a top side of the grip element,
actuating the mode operating element changes the currently active assistance mode to a next mode of increasing assistance, and
the top side of the grip element is accessible even if the grip element is moved into bearing contact with the interior trim of the motor vehicle and even if the grip element is counter sunk in the interior trim of the motor vehicle.

14. The motor vehicle as claimed in claim 1, wherein
the gripping element is provided in the interior trim located in a center console of the motor vehicle,
the center console has a recess bounded by a front wall closer to a shoulder of the driver and a back wall further from a shoulder of the driver, and
in transitioning from the autonomous assistance mode to the manual driving mode, the position of the grip element is adjusted to become further from the back wall of the recess and closer to the front wall of the recess.

15. The motor vehicle as claimed in claim 14, wherein the grip element is positioned flush with the front wall of the recess in the manual driving mode.

16. The motor vehicle as claimed in claim 14, wherein
the grip element is moved into bearing contact with the rear wall of the recess in the autonomous assistance mode,
a deactivation button is provided in the primary gripping area, at a distance from the grip element, and
the driver assistance device deactivates the currently active assistance mode when the deactivation button is actuated, such that the grip element becomes progressively closer to the front wall of the recess.

17. The motor vehicle as claimed in claim 14, wherein the grip element is moved into bearing contact with the rear wall of the recess in the autonomous assistance mode.

18. The motor vehicle as claimed in claim 1, wherein
the grip element is mounted in a monostable manner, permitting the grip element to be pivoted longitudinally, and
in the semi-automatic assistance mode, a distance between the motor vehicle and a vehicle traveling ahead is set my longitudinally pivoting the grip element.

19. A method for operating a motor vehicle using a driver assistance device of the motor vehicle, the driver assistance device being changeable between a plurality of assistance modes to independently guide the motor vehicle, the method comprising:
providing completely independent guidance of the motor vehicle in an autonomous assistance mode;
providing at least independent lateral guidance of the motor vehicle in a fully automatic assistance mode;
providing at least cruise control for the motor vehicle in a semi-automatic assistance mode;
providing no guidance at all for the motor vehicle in a manual driving mode;
actuating actuators via a control device to adjust a position of a grip element of the driver assistance device based on a currently active assistance mode, the control device assigning a respective position to the grip element for each of the assistance modes, the control device adjusting the position of the grip element such that in transitioning from the manual driving mode to the autonomous assistance mode via the semi-automatic assistance mode and the fully automatic assistance mode, the position of the grip element becomes progressively further from the steering wheel with increased independence of the driver assistance device, so as to provide orientation to the driver regarding the currently active assistance mode; and
adapting operating properties of individual operating elements integrated in the grip element, based on the currently active assistance mode.

* * * * *

UNITED STATES PATENT AND TRADEMARK OFFICE
CERTIFICATE OF CORRECTION

PATENT NO. : 9,216,743 B2  
APPLICATION NO. : 14/377139  
DATED : December 22, 2015  
INVENTOR(S) : Martin Wimmer et al.

Page 1 of 1

It is certified that error appears in the above-identified patent and that said Letters Patent is hereby corrected as shown below:

In Claim 18, Column 13, Line 32  
Delete "set my" and insert -- set by --, therefor.

Signed and Sealed this  
Twenty-sixth Day of April, 2016

Michelle K. Lee  
*Director of the United States Patent and Trademark Office*